United States Patent [19]
Adolphi et al.

[11] Patent Number: 5,389,993
[45] Date of Patent: Feb. 14, 1995

[54] AUTOMATED PHOTOGRAPHIC BACKDROP APPARATUS

[75] Inventors: John Adolphi, Eden Prairie; Michael Surma, Golden Valley; Gerald A. Jensen, Plymouth, all of Minn.

[73] Assignee: Lifetouch Portrait Studios Inc., Minneapolis, Minn.

[21] Appl. No.: 887,190

[22] Filed: May 21, 1992

[51] Int. Cl.6 .................... G03B 15/00; G09F 11/22
[52] U.S. Cl. ........................................ 354/291; 40/518
[58] Field of Search ............................ 354/291; 40/518

[56] References Cited

U.S. PATENT DOCUMENTS

| | | | |
|---|---|---|---|
| 439,512 | 10/1890 | Howe | 354/291 |
| 596,312 | 12/1897 | Badgley | 354/291 |
| 3,128,688 | 4/1964 | Coda | 354/291 |
| 4,340,293 | 7/1982 | Russotti | 354/291 |
| 4,649,264 | 3/1987 | Carson | 235/54 F |
| 5,168,647 | 12/1992 | Castro | 40/518 |
| 5,174,055 | 12/1992 | Aiken | 40/518 |

FOREIGN PATENT DOCUMENTS 2343284 3/1974 Germany .
0205927 9/1986 Japan .

*Primary Examiner*—Michael L. Gellner
*Assistant Examiner*—J. K. Han
*Attorney, Agent, or Firm*—Frederickson & Byron

[57] ABSTRACT

Apparatus for displaying one of several backdrops for use in a photographic studio. The backdrop scenes are attached end to end to form a long web, one end of which is wound upon one shaft and the other end of which is attached to a second shaft. A roller weight is placed on the web between the two shafts. The shafts are motor driven, allowing automated scrolling of the different backdrop scenes and the lowering of the roller weight when the appropriate scene is found. A steering mechanism is attached to the web to ensure it is properly wound up upon the shaft each time. Optical and/or mechanical sensors detect the position of the web and a central processing unit is provided for automated movement of the web from one backdrop to another, as desired.

20 Claims, 3 Drawing Sheets

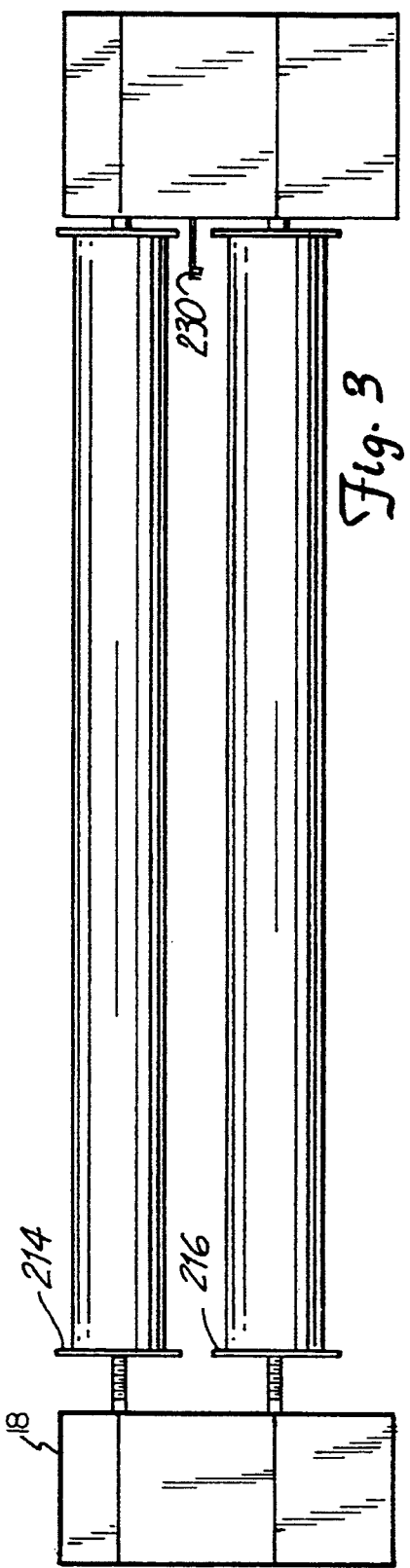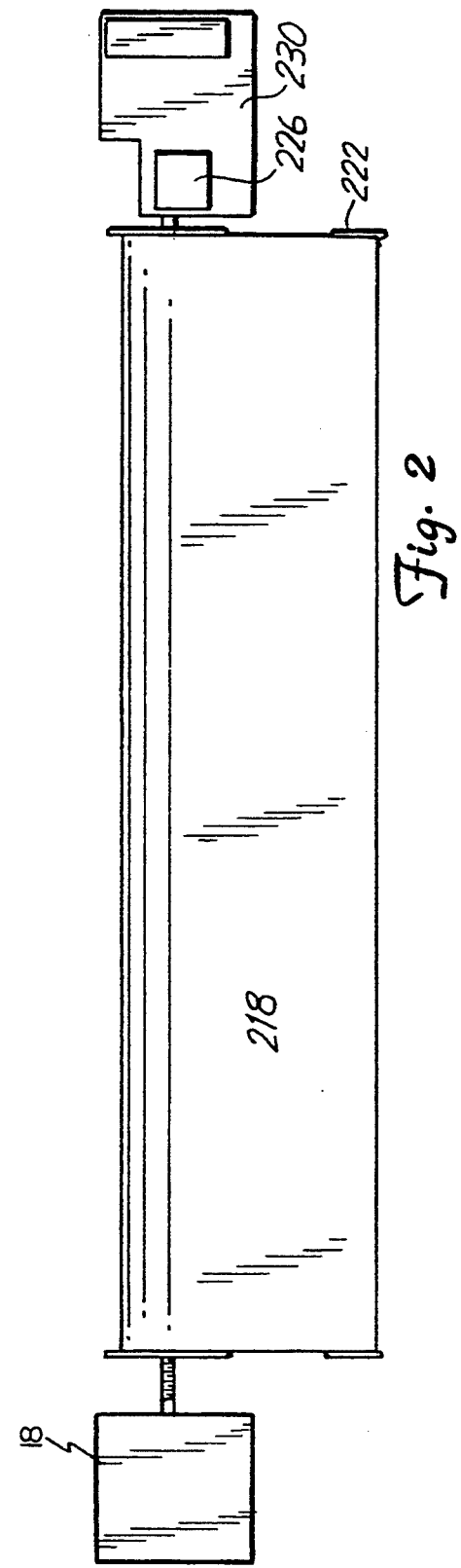

AUTOMATED PHOTOGRAPHIC BACKDROP APPARATUS

FIELD OF INVENTION

The present invention relates to photographic backdrops, and in particular, to an automated backdrop apparatus that is capable of automatically changing and accurately positioning a number of different backdrops.

BACKGROUND OF THE INVENTION

Photographic studios use backdrops containing various scenery pictures or color patterns as backgrounds for the portraits they create. As there are different occasions for having portraits taken and as people's tastes vary widely, portrait studios usually offer a variety of backdrop scenes. In studios using changeable backdrops, the backdrops are typically laid directly upon one another and then wound upon a single shaft suspended from the ceiling or other elevated structure. When a desired backdrop is needed, the backdrops are unwound from the shaft with the desired backdrop in front, all others being flipped over to unroll and hang behind the selected backdrop. Alternately, each backdrop is sometimes mounted on an individual roll with the rolls then mounted horizontally adjacent to one another.

The former system is quite bulky, heavy to manipulate and requires physical access to the roll in order to flip the undesired backdrops behind the roll as the desired backdrop is unrolled. The latter system has the disadvantage of requiring a large amount of overhead space. Moreover, since the shafts are typically mounted horizontally with respect to one another, if more than one or two backdrops are used, some will be noticeably further back from or closer to the photographic subject than others. As distances are very important in portrait photography (since they affect both focus and lighting), these nonuniform distances between the subjects and camera and the backdrops can produce unwanted photographic effects.

In an effort to solve these problems, some have tried connecting a series of backdrops end to end to form a continuous web. As indicated in U. S. Pat. No. 3,128,688, such a web is usually wound between two shafts to form a scroll. These backdrop roller devices, however, typically require an operator to manually maneuver the backdrops into position. This process is not only time-consuming, but it also introduces the possibility of human error as the operator attempts to correctly position a desired backdrop behind the subjects (particularly important for scenic backdrops which must be positioned exactly at the right height). Backdrops for these devices are also typically longer than necessary to allow for a reduction in the precision in locating the backdrop. The longer backdrops required more fabric and are thus more costly to manufacture. Furthermore, those devices in which the web hangs down from the shafts will frequently be improperly wound upon the shafts when the web is raised due to the twisting of the web that occurs as it is lowered and hangs free. A web that is improperly wound up upon a shaft will have a shortened life span and can tear or jam the shaft.

Prior attempts to solve the twisting problem include securing the lower portion of the web as shown in U. S. Pat. No. 596,312. Many photographic studios, however, use a neutral permanent backdrop located behind the changeable ones and such a solution has the disadvantage of not allowing the permanent backdrop to be used.

All of the above devices are less efficient because they require the attention of the photographer to operate the backdrop device and because of the added time needed to correctly position the backdrops. A need exists, therefore, for a photographic backdrop device that is capable of containing a large number of various scenes, but which can quickly, correctly and continuously position the scenes behind the posing subjects.

SUMMARY OF THE INVENTION

The present invention provides a changeable photographic backdrop apparatus comprising a scroll with two rotatable shafts. A web is attached at its opposite ends to the shafts and is then at least partially wound upon one or both of the shafts. A roller weight is disposed on the web between the shafts so that when a portion of the web is unwound from the shafts, the roller weight causes the web to hang generally vertically downward.

The backdrop includes a stabilizer for preventing the web and roller weight from twisting when it is raised or lowered. This ensures that the web will always properly wind up upon the shafts. By permitting the web to be raised, the stabilizer also allows a permanent backdrop behind the web to be used.

Detection apparatus is also provided for determining the relative position of the web with respect to the shafts—preferably bar codes or colored patches on the backdrops and bar code reading or optical and mechanical sensor means associated with the shafts. The shafts and detection apparatus allow the backdrop to be quickly changed from one backdrop to another, and automatic selection from among a large number of different scenes is possible without the need to manually rotate the shafts or position the scenes.

BRIEF DESCRIPTION OF THE DRAWINGS

FIG. 2 is a front view of the backdrop apparatus with the web partially unwound.

FIG. 3 is a top view of the backdrop.

DETAILED DESCRIPTION OF THE INVENTION

The photographic backdrop apparatus, generally designated 210, is intended for use in a photographic portrait studio or similar setting. It is contemplated that the apparatus will be attached to and suspended from a frame, which may either be free-standing, mounted on a wall or suspended from the ceiling in any conventional fashion.

Figure 1:
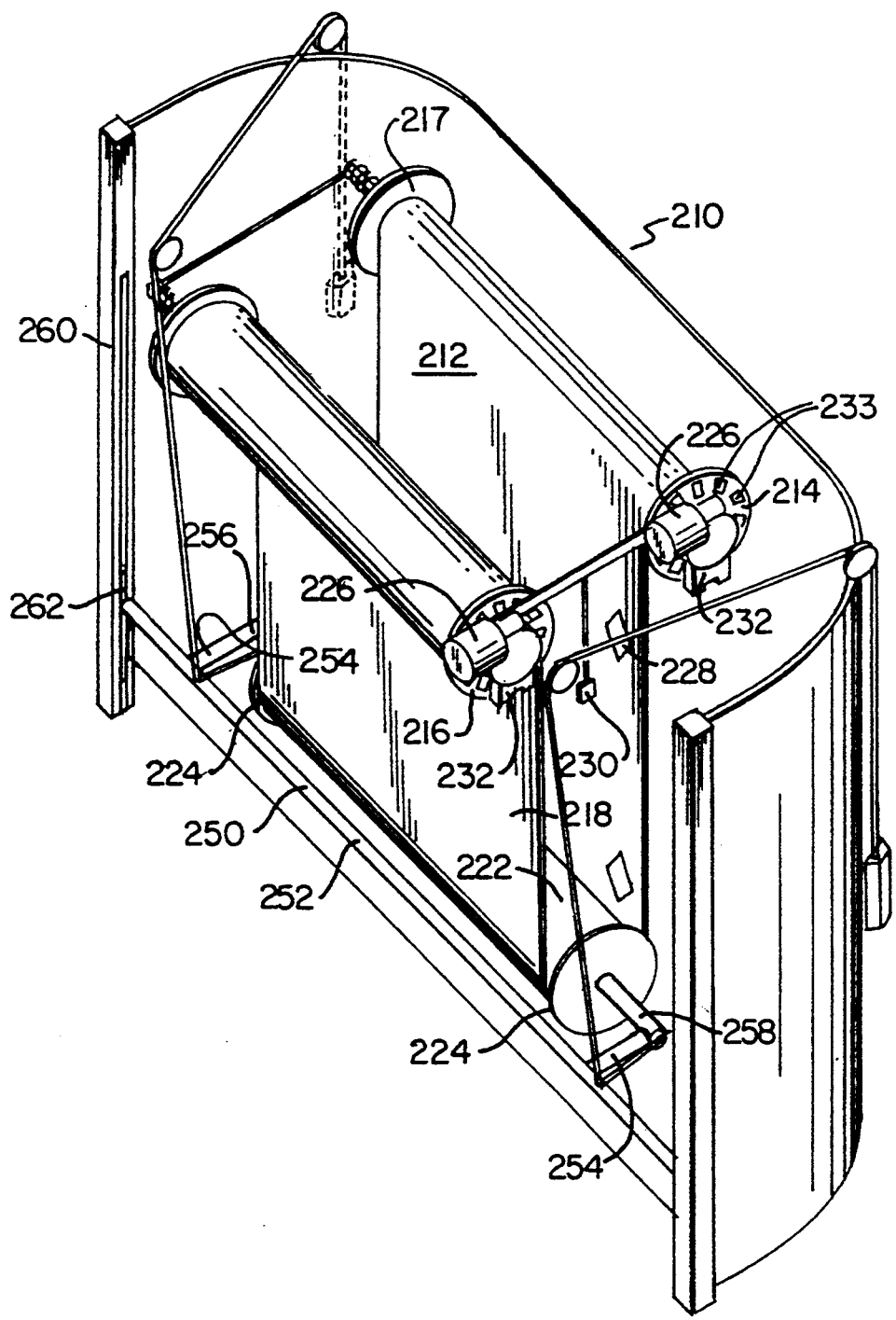
FIG. 1 is a perspective view of the backdrop apparatus with the web partially unwound.
Figure 4:
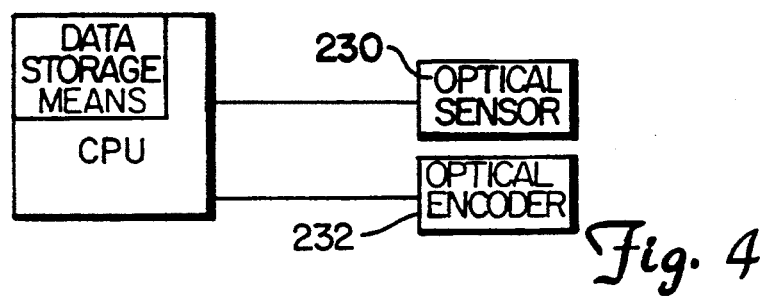
FIG. 4 is a schematic illustration showing the CPU.

As shown in FIGS. 1–3, the backdrop apparatus is comprised of a scroll 212 containing first and second rotatable shafts 2 14 and 216 positioned in a generally parallel relationship with each other. The shafts 214, 216 are desirably of a generally circular cross section. The diameter of the shafts will vary depending upon such factors as the number of backdrops being used and the stiffness of the backdrop material (larger diameters are more suitable for stiffer materials). Preferably the diameter is between about 4 inches and 6 inches. The length of the shafts 214,216 is selected to correspond to the width of the backdrops being used—typically about 4-6 feet for most studio portrait applications (though any suitable length can be used). Like the dimensions of the shafts, the material of which the shafts are constructed will vary according to the particular needs of the individual portrait studio. Further considerations in the shafts' construction will be cost and strength of materials. In many applications, aluminum shafts work well.

The shafts 214, 216 can be attached or suspended to an overhead structure by any appropriate means. In the preferred embodiment, suitable brackets are secured by screws to a wooden frame 18. Also in the preferred embodiment, each shaft 214, 216 has a flange 217 extending outwardly from its ends. The flanges desirably have slots 233 uniformly placed along their outer surface. These slots 233 can be used to assist in the placement of the backdrops, as desired below.

A continuous web 218, on which various colored backdrops (not shown) are printed or painted, is attached at its opposite ends to the first and second shafts 2 14, 216 forming the scroll 212. The web 218 is at least partially wound up upon one of the shafts. The web 218 can be constructed of canvas or paper or any other suitable material that meets the particular requirements of the user. A material which has worked particularly well is Reemay. The length of the web 218 will vary according to the number of scenes desired—in a preferred embodiment, on a 5.5 foot wide web, each backdrop is about 7 feet long, and 12 different backdrops are included, yielding a web of about 90 feet in length.

Disposed on the web 218, intermediate the two shafts 214, 216, is a roller weight or idler roller 222. The weight of the roller 222 assists in lowering the web 218 when a backdrop is deployed, and helps keep the backdrop in a vertically straight orientation. The roller weight 222 can have any appropriate dimensions. Desirably it has a generally circular cross section and is slightly longer than the width of the web 2 18. In the preferred embodiment, each end of the roller weight 222 extends beyond the edges of the web 218 and terminates in a radially extending flange 224. The flanges 224 help to horizontally locate the roller weight 222 on the web 218, particularly as the roller weight 222 rotates as the web is wound and unwound. In an alternate embodiment, neither the roller weight 222 nor the shafts 214, 216 contain flanges at their ends. The stabilizer (described below) and the mechanization of the backdrops help to ensure that the roller weight 222 and shafts 214, 216 continually remain in their proper orientations during operation.

Each shaft 214, 216 is desirably rotatably driven. Although any suitable means can be used to rotate the shafts, in the preferred embodiment, the shafts 214, 216 are driven by electric direct-drive stepper motors 226. The motors 226 work in coordinated fashion to rotate the shafts 214, 216, transferring the backdrops back and forth between the shafts as desired. In this way, any one of the backdrop scenes can be selected and the motors 226 used to rotate the shafts 214, 216 to deploy the selected backdrop in the proper position for use. In an alternate embodiment, the backdrops can be changed by manually rotating the shafts through the use of a timing belt wrapped around gears connected to each shaft.

Frequently the frame containing the backdrop apparatus will itself contain a permanent backdrop on its surface, often somewhat larger than the backdrops on the web. This backdrop is usually permanently attached to the frame and typically is used for photographing larger groups. If the use of this permanent backdrop is desired, the motors 226 can be operated to fully wind up the web 218, thereby elevating the roller weight 222 and revealing the permanent backdrop mounted on the frame.

Besides raising to reveal the permanent backdrop, in the preferred embodiment, the roller weight 222 and the web 218 also rise up when the shafts 214, 216 rotate to place a new backdrop into position. This action acts as a safety feature as it removes the rotating roller weight 222 and web 218 from the reach of children who are having their portraits taken or are otherwise in the studio.

Lowering and raising the roller weight 222 and the web 218 will frequently result in a torque being applied to the roller weight 222 and the lower portion of the web 218, causing them to twist slightly in relation to the shafts 214,216. Even a slight twisting of the roller weight 222 and web 218 can result in the roller weight 222 residing in a vertical plane that is not parallel with the vertical planes of the shafts 214,216. When the web 218 is then wound up upon the shafts 214, 216, the web 218 will do so at an improper orientation and advance along the shaft it is being wound upon in a telescopic fashion. This telescoping weakens the web 218 and frequently causes it to tear and, in extreme cases, can jam the backdrop machinery.

To eliminate this problem, stabilizing means are used to secure the roller weight 222 in its proper parallel orientation when the web 218 is fully extended downward. The stabilization method should desirably allow for the roller weight 222 to be raised and lowered so that the permanent backdrop can still be used and the rotating roller weight 222 removed from the reach of children. Furthermore, the stabilization method should continue to steer the roller weight 222 during those times it is being raised and lowered.

In the preferred embodiment, a cantilever stabilizer 250 is used to prevent the roller weight 222 from twisting. The stabilizer 250 consists of a steering bracket 252 which spans the approximate width of the permanent backdrop. Two arms 254 extend from the bracket 252 and are attached to the axis of the roller weight 222. The roller weight axis can be one uniform piece or can desirably be made up of a first and second axial segment 256, 258 which extend outwardly from the ends of the roller weight 222.

The stabilizer also desirably includes transportation means for assisting in the raising and lowering of the roller weight In the preferred embodiment, a vertically recessed track 260 is located along the entire length of the permanent backdrop and is desirably placed along the outermost edge of the backdrop so that it is outside of the sight lines of the camera. Both ends of the bracket 252 are attached to a runner 262 which resides within the track 260. The runner 262 is desirably secure within the track 260 yet free to move with the vertical motion of the bracket 252. In the preferred embodiment, this is accomplished through the use of ball bearings positioned along the runner 262. Also in the preferred embodiment, the stabilizing system is counterbalanced to achieve ease in movement and to remove much of the weight placed upon the roller weight 222 and web 218 by the addition of the bracket 252. Any suitable counterbalancing system can be used, but in the preferred embodiment, weights are attached to the bracket 252 by means of pulleys and wires running from the bracket 252 to the weights, which are located behind the permanent backdrop. The first and second axial segments 256, 258 desirably contain guides for directing the wire around the segments 256, 258 while ensuring the smooth rotation of the roller weight 222. As a safety feature, all of the components of the stabilizer can desirably be padded.

A stabilizer can also be used with the manual backdrop. In the preferred embodiment, the stabilizer includes two supports separated by the width of the backdrop. Each support desirably contains a V-shaped slot which terminates into a vertical groove which is slightly wider than the diameter of the roller weight. When the web is lowered and the roller weight descends, the V-shaped slot directs it into the vertical groove, where it snugly rests.

An external central processing unit (CPU) may be used to continuously detect and/or calculate the location of the web 218 with respect to the shafts 2 14, 216 and to accordingly operate the stepper motors 226. The proper placement of a backdrop may be achieved through the use of the CPU, optical and/or mechanical sensors and marks carried by the backdrops which are detectable by the sensors. In the preferred embodiment, darkened patches (preferably black non-reflective tape) are strategically placed on the back of the web 218 and an optical sensor 230 is used to detect the presence of the patches 228. The patches 228 can be placed at any convenient part of the web 218, although they are desirably placed so that the patch for a particular backdrop is juxtaposed across from the optical sensor 230 when the backdrop is in its approximate deployed position.

The patches 228 are desirably of a shade which contrasts with that of the back of the web 218 so that they are detectable by the sensor 230. The optical sensor 230 is in turn electronically connected to the CPU. A sensor capable of tracking the revolutions of at least one of the shafts is also desirably employed and connected to the CPU. In the preferred embodiment, an optical encoder 232 is positioned near each shaft for this purpose. In an alternative embodiment, the CPU can itself include counters for keeping track of the revolutions of the shaft. Moreover, more sophisticated bar codes (a single black patch being the most elementary bar code) can be used to carry information identifying a particular backdrop.

In use, the locations of various backgrounds on the web are stored in the CPU and the CPU, encoders and sensors cooperate to properly position the backdrops. The desired backdrop, or a sequence of desired backdrops, is selected by the operator and relayed to the CPU. In the preferred embodiment, the CPU activates the stepper motors 226 to rotate the shafts in the appropriate direction that will move the desired backdrop towards the deployed position. While the shafts 214,216 are rotating, the encoders 232 next to the shafts 214, 216 track their revolutions by detecting the light and dark regions produced by the now rotating slots 233 on the flanges 217 of the shafts 2 14, 216. The CPU may be programmed to operate the motors 226 to rotate the shafts 214, 216 at various speeds depending on how far the web 218 must travel to reach the selected backdrop. Meanwhile, the encoders 232 provide the CPU with information which allows the CPU to calculate the location of the desired backdrop in relation to the shafts 214, 216.

Once the encoders 232 detect that the desired backdrop is within proximity of being unwound, the CPU may decrease the speed of the motors 226 and allow the optical sensor 230 to aid in the proper positioning of the web through the use of the patches 228. The data read by the optical sensor 230 is relayed to the CPU. When the desired backdrop reaches its appropriate location, the optical sensor 230 detects the corresponding patch and relays this information to the CPU. If the roller weight 222 is elevated, the CPU can shut off one motor so that the shaft receiving the web stops turning. This causes the roller weight 222 to descend, thereby lowering the desired backdrop. When the backdrop is lowered to its correct location, the CPU shuts off the other motor. In the preferred embodiment, the patches are placed within $\frac{1}{4}$ inch of the proper placement of the backdrop. In this way, the rotation of the shafts 214, 216 can be stopped as soon as the optical sensor 230 detects a patch.

If the roller weight 222 is already in its lowered position, the CPU will continue to operate both motors until the desired backdrop is properly placed in its final position. Both motors are then shut off. This results in the exact placement of the desired backdrop each time.

The patches 228 read by the optical sensor 230 can also, in the preferred embodiment, include a reference patch. The reference patch is desirably of dimensions different from that of the other patches so that the optical sensor and CPU can use it as a reference for properly locating the web each time the system is turned on (i.e., the system can index through an initiation sequence in which the system detects the reference patch to recalibrate the position of the web with respect to the rotation of the shafts and counting of the individual patches).

A variety of detection means can be used with this apparatus. Additionally, the type of detection patches can also vary. For example, sophisticated bar codes and a bar code scanner may be used in lieu of the simple colored squares.

In one preferred embodiment, the CPU includes memory means for storing a sequence of backdrops, or a number of possible sequences, that may be utilized in a typical photo session. Once the photographer is finished with a particular backdrop, he or she merely indicates this fact to the CPU which then maneuvers the next required backdrop into place in the manner described above.

While a preferred embodiment of the present invention has been described, it should be understood that various changes, adaptations and modifications may be made therein without departing from the spirit of the invention and the scope of the appended claims.

What is claimed is:

1. A changeable backdrop, comprising:
    a scroll having rotatable first and second shafts and a web attached at opposite ends to the first and second shafts, the web being partially wound upon at least one of the shafts;
    a roller weight disposed on the web intermediate the shafts so that when a portion of the web is unwound from the shafts the roller weight causes such portion to hang generally vertically downwardly;
    stabilizing means comprising a steering bracket attached to the roller weight for positioning the roller weight in a lowered position in a vertical plane that is parallel to the vertical planes of the shafts, the steering bracket allowing the roller weight to move generally vertically between a first position elevated proximate the shafts to a second position lowered away from the shafts; and a track and a runner carried by the track, the runner being attached to the steering bracket.

2. The backdrop of claim 1 wherein the track is positioned outside of the sight lines for the backdrop.

3. The backdrop of claim 1 wherein the stabilizing means further comprises counter-balancing means for assisting in the support of the bracket.

4. The backdrop of claim 3 wherein the counter-balancing means comprises a counter weight attached to the bracket by means of a wire and a plurality of pulleys.

5. The backdrop of claim 1 including at least one motor for rotating the first and second shafts.

6. The backdrop of claim 5 wherein the motor comprises a stepper motor.

7. The backdrop of claim 6 including means for controlling the stepper motor to selectively rotate the shaft to orient a particular portion of the web to hang downwardly from the shafts.

8. The backdrop of claim 1 including a frame for suspending the shafts and wherein the shafts are mounted closely adjacent to one another on the frame so that the unwound portion of the web hangs substantially vertically.

9. The backdrop of claim 1 wherein the roller weight is substantially the same length as the width of the web and includes flanges extending slightly beyond the edges of the web to laterally position the roller weight with respect to the web.

10. The roller weight of claim 9 wherein the roller weight is of a diameter of between 4 and 7 inches 11. The backdrop of claim 1 wherein the web surface contains a plurality of backdrop scenes.

12. The backdrop of claim 1 including
a central processing unit;
first and second sensors;
a motor; and
patches disposed on the web, the first sensor being capable of tracking the number of revolutions of the shafts and conveying that information to the central processing unit which compares the information with its stored data, to determine generally the position of the web with relation to the shafts and the second sensor being capable of reading the patches on the web and relaying that information to the central processing unit to precisely position the web with relation to the shafts, the central processing unit being capable of processing the information from the first and second sensors to operate the motors to corresponding position the web.

13. A changeable backdrop, comprising;
a scroll having rotatable first and second shafts and a web attached at opposite ends to the first and second shafts, the web being partially wound upon at least one of the shafts;
a roller weight disposed on the web intermediate the shafts so that when a portion of the web is unwound from the shafts the weight causes such portion to hang generally vertically downwardly;
stabilizing means comprising a steering bracket attached to the roller weight for positioning the roller weight in a lowered position in a vertical plane that is parallel to the vertical planes of the shafts, the steering bracket allowing the roller weight to move generally vertically between a first position elevated proximate the shafts to a second position lowered away from the shafts; a track and a runner carried by the track, the runner being attached to the steering bracket: and
detection means for sensing and determining the relative position of the web with respect to the shafts.

14. The backdrop of claim 13 wherein the detection means comprises a detectable code disposed on the web and code detection means for detecting such codes mounted adjacent to at least one of the shafts whereby the relative position of the web with respect to the shafts can be determined.

15. The detection means of claim 14 wherein the detectable code comprises a plurality of patches on the web and the code detection means includes an optical sensor capable of detecting the patches.

16. The backdrop of claim 15 wherein the detection means includes a central processing unit with data processing and data storage means for determining the location of each backdrop with respect to the web.

17. The backdrop of claim 16 wherein the storage means includes data on the relative position of all the backdrop selections.

18. The backdrop of claim 17 wherein the detection means includes counting means for counting the revolutions of at least one of the shafts to help determine the position of the web with respect to the shafts.

19. The backdrop of claim 18 wherein the counting means comprises an optical encoder.

20. A changeable backdrop, comprising:
a scroll having rotatable first and second shafts;
a web attached at opposite ends to the first and second shafts, the web containing a plurality of different backdrop selections and being partially wound upon at least one of the shafts;
a frame for suspending the shafts, the shafts being mounted on the frame closely adjacent to one another so that the unwound portion of the web hangs substantially vertically;
rotating means for rotating the first and second shafts comprising a motor associated with each shaft and means for controlling the motors to selectively rotate the shafts to select a particular portion of the web to hang downwardly;
a roller weight of substantially the same length as the width of the web, the roller weight being disposed on the web intermediate the shafts so that when a portion of the web is unwound from the shafts the roller weight causes such portion to hang generally vertically downwardly, the roller weight including flanges on opposite ends of the roller weight to laterally position the roller weight with respect to the web;
patches printed on the web and an optical sensor mounted adjacent to at least one of the shafts for detecting the patches to determine the relative position of the web with respect to the shafts;
a steering bracket attached to the roller weight for positioning the roller weight in a lowered position in a vertical plane that is parallel to the vertical planes of the scrolls; a track, and a runner carried by the track, the runner being attached to the steering bracket, for allowing the roller weight to be raised and lowered; and
a counterweight attached to the steering bracket by means of a wire and a plurality of pulleys for assisting in support of the bracket.

* * * * *